United States Patent

[11] 3,588,366

[72] Inventors Ferdinando Formenti;
Giuseppe Valbonesi, Milan, Italy

[21] Appl. No. 828,487
[22] Filed May 28, 1969
[45] Patented June 28, 1971
[73] Assignee Societa Italiana Telecommunicazioni Siemens Milan, Italy
[32] Priority May 30, 1968
[33] Italy
[31] 17120A/68

[54] SIGNALING CIRCUITRY FOR TIME-SHARING TELECOMMUNICATION SYSTEM
8 Claims, 4 Drawing Figs.

[52] U.S. Cl. .......... 179/15, 179/18, 179/84
[51] Int. Cl. .......... H04j 3/12
[50] Field of Search .......... 179/18.9, 84 (VF), 90 (BD), 15 (AT), 15 (Sig.)

[56] References Cited

UNITED STATES PATENTS

| | | | |
|---|---|---|---|
| 3,223,783 | 12/1965 | Yamamoto .......... | 179/15(Sig.) |
| 3,391,253 | 7/1968 | Grandmaison .......... | 179/84(VF) |

*Primary Examiner*—Ralph D. Blakeslee
*Attorney*—Karl F. Ross

ABSTRACT: Communication–especially telephone–system with a plurality of local lines sequentially connectable to a common terminal for a brief sampling interval during which incoming message samples are stored on a condenser which immediately thereafter discharges through a filter into the corresponding local line. To signal a subscriber on the line, a continuous audiofrequency wave generated at the terminal is chopped into a train of brief pulses stored on a common capacitor between successive sampling intervals, this capacitor charging the line condenser of an individual subscriber only if, during the corresponding sampling interval, an enabling pulse coincides with a modulating pulse measuring a characteristic signaling period.

Ferdinando Formenti
Giuseppe Valbonesi
INVENTORS.

BY

Karl G. Ross
Attorney

SIGNALING CIRCUITRY FOR TIME-SHARING TELECOMMUNICATION SYSTEM

Our present invention relating to a telecommunication system, particularly, for the transmission of telephone conversations, in which several local lines (referred to hereinafter as "subscribers") are connected to a common terminal for exchange of messages with a remote station, e.g. by way of a common trunk.

In our copending application Ser. No. 645,685, filed June 13, 1967, we have disclosed a time-sharing telecommunication system wherein, during successive sampling intervals forming part of a clock cycle, samples of incoming messages are momentarily stored on individual line condensers of respective subscribers, these condensers being discharged immediately thereafter by way of a line filter which integrates the stored samples of consecutive clock cycles to reconstitute the original message. In a specific instance contemplated by us, a clock cycle lasts for 100 $\mu$s and is divided into 100 phases of 1-$\mu$s duration.

In practice, an actual sampling interval is somewhat shorter than a phase, the first half of this interval being allotted to the discharge of the previously charged line condenser over an outgoing path while the second half serves for the recharging of that condenser over an incoming path; the remainder of the clock cycle is available for transmission of the incoming message sample to the local subscriber and storage of an outgoing message sample from the subscriber on that condenser.

The general object of our present invention is to provide simplified circuitry in such a system for selectively transmitting various tone signals (as distinct from binary code signals) relating to the establishment of a connection (e.g. dial tone, busy signal or ringing signal) to local subscribers from the associated terminal or, possibly, to remote subscribers by way of an intervening trunk line.

A more specific object of our present invention is to provide means for transmitting these signals to the subscribers of a time-sharing telecommunication system with the aid of a single tone generator common to all local lines.

For purposes of this disclosure, the timer-controlled gates individually associated with the several subscribers to establish the respective sampling intervals will be referred to hereinafter, and particularly in the appended claims, as "first gate means." In accordance with our present invention, a "-second gate means" common to all the local lines is interposed between the aforesaid first gate means and a common tone-generating means to chop the output thereof, usually an audiofrequency oscillation, into a train of brief pulses which are selectively passed on to the subscribers for which they are intended, the second gate means being jointly controlled for this purpose by the timer or clock circuit establishing the sampling intervals and by a source of modulating pulses whose duration substantially exceeds the period of the operating frequency of the tone-generating means. The latter period, in turn, is substantially greater than a clock cycle so that a sine wave produced by the tone-generating means can be readily reconstituted by successive samplings.

The selection of the subscriber lines destined to receive the generated tone signals is controlled by enabling pulses originating at a logic network which monitors the establishment of a connection and, in accordance with such determination, generates an enabling pulse at the proper instant to unblock the second gate means. Reference in this connection may be made to commonly owned copending application Ser. No. 802,486, filed Feb. 26, 1969 by Saverio Martinelli and Giorgio De Varda, and to the corresponding Italian Pat. No. 824,625. According to these prior disclosures, the logic network may be controlled by a combination of three circulating memories, i.e. a first memory containing the numbers of the calling subscribers in respective time slots, a second memory containing the numbers of the cold subscribers in corresponding time slots and a third memory in which the establishment of the connection between any calling and called subscriber is progressively registered in similar time slots. It is this third memory which, in the system referred to, generates a variety of signal pulses actuating a tone generator for the purpose of apprising a subscriber of the progress of his call.

According to a more specific feature of our invention, the tone generator works into a capacitor which is common to all the local lines and which is charged between any two consecutive sampling intervals, thus during a fraction of each phase allotted to the establishment of a calling connection between two subscribers, under the control of a clock pulse emitted by the timer to open a charge gate forming part of the aforementioned second gate means. If either of these subscribers is to receive a tone signal, the common capacitor is allowed to charge the individual line condenser of this subscriber by way of a discharge gate also included in the second gate means, the latter gate being jointly controlled by the enabling pulses from the logic network and by a modulating pulse which determines the length and spacing of the tone signals transmitted to the subscriber. Usually, the modulating pulses will be derived from several pulse generators operating in different rhythms which characterize the various type of signal; the outputs of these pulse generators and the enabling pulses from the logic network are then combined, according to a further feature of our invention, by logic circuitry including a plurality of AND gates working into a common OR gate.

Since the common capacitor must be charged during an extremely short period corresponding to roughly one-third of a microsecond (or about 300 ns) under the conditions previously assumed, our invention also aims at providing an aperiodic charging circuit for this purpose. This particular object is realized, in a preferred embodiment, through the use of an amplifier including two transistor stages of opposite conductivity types connected in parallel across the output of the tone generator.

The above and other features of our invention will be described hereinafter in greater detail with reference to the accompanying drawing in which.

Figure 1:
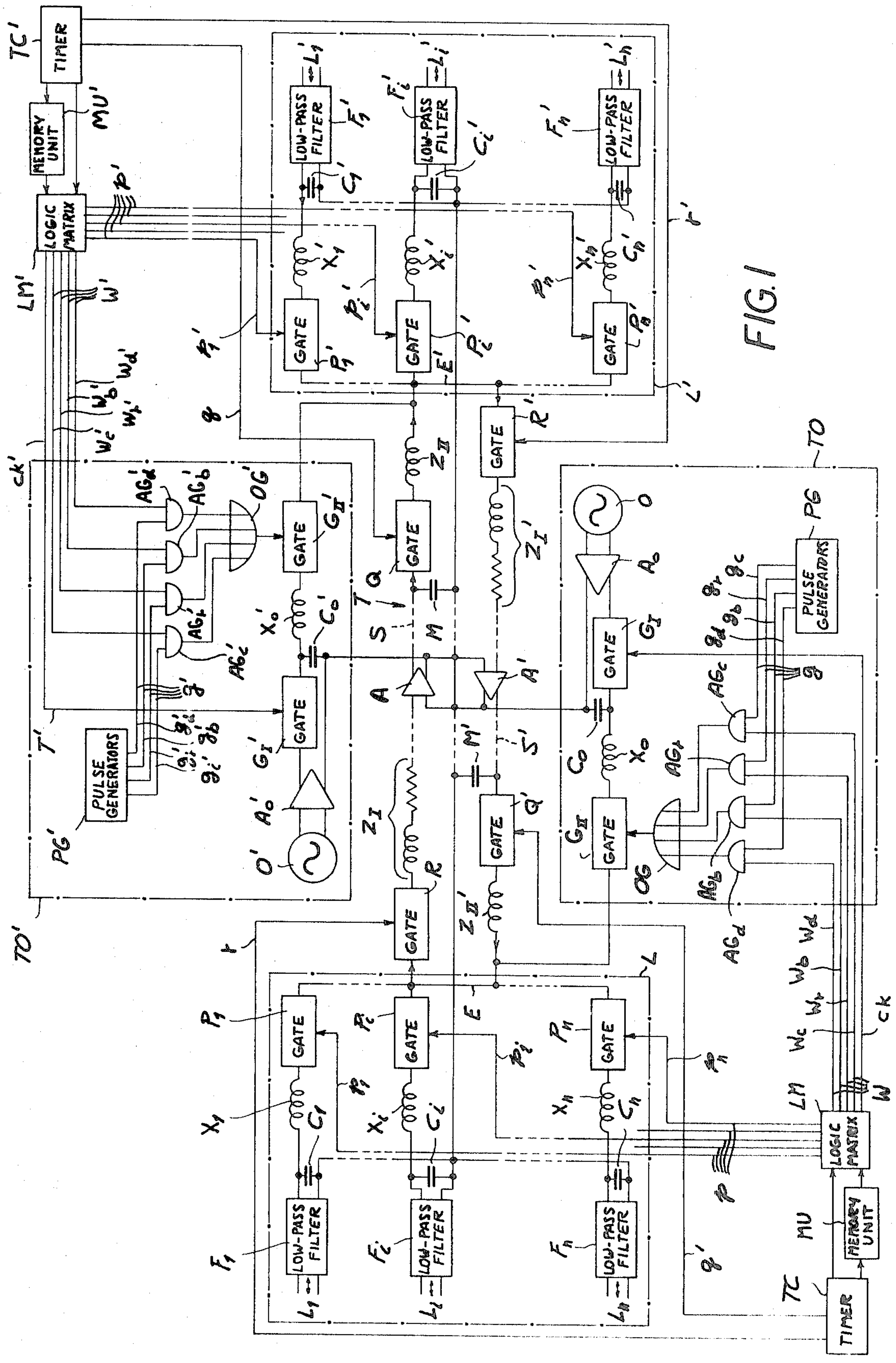
FIG. 1 is a circuit diagram illustrating a telephone communication system similar to that of our above-identified copending application, incorporating the present improvement.

In FIG. 1 we have diagrammatically illustrated a first plurality of local lines, collectively designated L, and a second plurality of local lines, collectively designated L', between which it is possible to establish concurrent two-way conversations on a time-sharing basis by way of a common trunk T. The local lines L and L' are individually connectable, via crossbar switches and other conventional telephone-exchange equipment, to individual subscribers in a manner well known per se and not further illustrated. The first line $L_1$, an intermediate line $L_i$ and the last line $L_n$ on the left as well as corresponding lines $L_1'$, $L_i'$, and $L_n'$ on the right have been shown in detail. Each of these local lines terminates, at its end proximal to the trunk T, in a low-pass filter $F_1$, $F_i$, $F_n$ or $F_1'$, $F_i'$, $F_n'$ and a storage condenser $C_1$, $C_i$, $C_n$ or $C_1'$, $C_i'$, $C_n'$ which, of course, could also be representative of a combination of such capacitors.

The trunk T includes a pair of branch conductors S, S' and a common conductor $S_o$ (which may be grounded), the branch leads S, S' being tied together at their ends E, E' representing the two terminals of the trunk. Access between terminal E and any of the local lines $L_1$, $L_i$, $L_n$ can be had through respective two-way gates $P_1$, $P_i$, $P_n$; similarly, terminal E' is connectable to any of lines $L_1'$, $L_i'$, $L_n'$ through respective bidirectional gates $P_1'$, $P_i'$, $P_n'$. These gates, normally blocked, are periodically opened in rapid cyclic succession by respective leads $P_1$, $P_i$, $P_n$ (collectively designated *P*) and $P_1'$, $P_i'$, $P_n'$ (collectively designated *P'*) extending from logic matrices LM, LM' controlled by a pair of synchronized timers TC and TC', the open time of each gate representing a sampling interval. The two timers also control the opening and closure of two further gates R, Q in trunk branch S, $S_o$ via respective leads $r$, $q$ and similar relays R', Q' in trunk branch S', $S_o$ via respective leads $r'$, $q'$.

Each of the two trunk branches includes a repeater, in the form of a one-stage current amplifier A and A', effective for transmission from left to right and from right to left, respectively. An intermediate condenser M, which may again be representative of a combination of several capacitors, is connected across branch S, $S_o$ beyond amplifier A (i.e. to the right thereof); in analogous manner, an intermediate condenser M' is connected across branch S', $S_o$ downstream (i.e. to the left) from amplifier A'.

Condenser M divides the branch S, $S_o$ into an input section, including the gate R and the amplifier A along with an impedance $Z_I$ in the input of the latter, and an output section including gate Q in series with an impedance $Z_{II}$. Similar impedances $Z_I'$ and $Z_{II}'$ are included in corresponding sections of branch S', $S_o$.

In the embodiment of FIG. 1, impedances $Z_I$, $Z_I'$ are shown as being both inductive and resistive and are designed to provide critical damping for a discharge of condensers $C_i$, $C_i'$ (or corresponding condensers of the other local lines), in the open conditions of gates $P_i$, R and $P_i'$, R', through the input circuit of the respective amplifiers A and A', taking into consideration the input impedances of the amplifiers and the line impedances of the corresponding trunk sections. Impedances $Z_{II}$ and $Z_{II}'$, on the other hand, are substantially purely inductive to provide for a resonant discharge of condensers M and M' in the open conditions of gates Q and Q'.

When, in the course of an operating cycle of the two synchronized timers, a pair of gates such as $P_i$, $P_i'$ are unblocked whose subscriber lines (e.g. $L_i$, $L_i'$) have messages to transmit to each other, the corresponding storage condensers $C_i$, $C_i'$ carry charges whose magnitudes correspond to the instantaneous amplitudes of respective signal waves passed by filters $F_i$ and $F_i'$. The corresponding unblocking pulse lasts for a sampling interval of, roughly, 0.7 ms. Concurrently therewith, pulses are transmitted over leads $r$, $r'$ to open the gates R, R' these pulses lasting only for a fraction of the aforementioned sampling interval. At that point, condenser $C_i$ discharges through gates $P_i$ and R, impedance $Z_I$ and the input circuit of amplifier A, the resulting current following an aperiodic curve due the critical damping. At the same time, condenser $C_i'$ discharges through gates $P_i'$ and R', impedance $Z_I'$ and the input circuit of amplifier A' with a similar current. Immediately thereafter, gates R and R' are closed and gates Q and Q' are opened by respective pulses on leads $q$ and $q'$, lasting to the end of the sampling interval. Condenser M, which during the initial period was aperiodically charged, now discharges through gate Q and inductance $Z_{II}$ into the previously discharged storage condenser $C_i'$ which has not had time to acquire an appreciable outgoing charge through filter $F_i'$. Simultaneously, condenser M' transfers its previously acquired charge to condenser $C_i$.

During the ensuing clock cycle, the new charges on condensers $C_i$ and $C_i'$ are dissipated through filters $F_i$ and $F_i'$ in the form of signal waves traveling toward the associated subscribers. If either subscriber continues talking, his voice currents will recharge the respective storage condenser in time for the next sampling interval.

The operation so far described is essentially the same as in the system of our copending application Ser. No. 645,685 referred to above.

In order to establish the talking connection between the two subscribers served by lines $L_i$ and $L_i'$, certain equipment at the central office associated with the calling subscriber must intervene. This equipment, more fully described in the commonly assigned application Ser. No. 802,486 and the corresponding Italian Patent previously identified, is indicated diagrammatically in FIG. 1 as a memory unit MU controlled by timer TC and working into the logic matrix LM at the first exchange, assumed hereinafter to be the one handling an outgoing call, and as an analogous memory unit MU' at the second exchange. Each of these memory units includes a first or calling-subscriber memory, a second or called-subscriber memory, and a third or monitoring memory, each preferably of the circulating type and designed to store up to 100 4-bit code combinations in a like number of time slots or phases. If, as assumed by way of example, each time slot lasts for 1 microsecond, a complete operating cycle of each memory has a duration of 0.1 ms. Some of the phases of each memory may be set aside for supervisory and line-scanning purposes. Thus, in the specific system of Martinelli and De Varda under discussion, only 96 of the 100 phases are used to inscribe in the first and second memories the identities of the calling and called stations (which may include subscribers or trunk lines) while one of the four remaining phases is utilized to register, in cyclic succession, the identities of 1,000 associated subscribers at the beginning of as many consecutive clock cycles. Any subscriber line so registered is tested, 10 times per second, to determine whether it is about to initiate a call; if this is so, the number of the subscriber is entered in an available time slot of the first memory and the subscriber receives a dial tone inviting him to select the station he wishes to reach. The identity of the called subscriber (or trunk) is then inscribed in the corresponding time slot of the second memory whereupon the calling subscriber receives either a busy signal or a calling signal which accompanies the transmission of ringing current to the remote station. Other tone signals may be used for similar purposes, e.g. to apprise one of the two participating subscribers that the line has been released, i.e. that the other subscriber has hung up.

The third memory within unit MU, operating in step with the other two memories, registers in any of its time slots the fact that a calling subscriber has been inscribed in a corresponding time slot of the first memory, the inscription of a called subscriber in a corresponding time slot of the second memory, the free or busy condition of the called line, the commencement of ringing, the establishment of a talking connection, and the termination of a call. From this memory, accordingly, there emanates a variety of signal pulses which, at various stages in the establishment and termination of a connection, cause the energization of different output leads of logic matrix LM. Four such output leads $w_c$, $w_r$, $w_b$ and $w_d$ (collectively designated $w$) have been shown by way of example, the subscripts "$c$," "$r$," "$b$" and "$d$" respectively signifying "calling," "release," "busy" and "dial tone." Corresponding output leads of matrix LM' have been designated $w_c'$, $w_r'$, $w_b'$ and $w_d'$. A further output lead $ck$ (or $ck'$) carries a clock signal periodically recurring during each phase, i.e. at a cadence of 1 ms.

With the exception of pulse $ck$ or $ck'$, the pulses appearing on leads $w$ or $w'$ coincide only with selected phases of each clock cycle, i.e. with those phases in which one of the selected tone signals is to be transmitted to a particular subscriber connected to the corresponding terminal.

All these tone signals are derived from a single audiofrequency oscillator O (or O') whose output, after passing through an amplifier $A_o$ (or $A_o'$), is stored on a common capacitor $C_o$ (or $C_o'$) upon traversing a charging gate $G_I$ (or $G_I'$) which is periodically opened by the pulses $ck$ (or $ck'$). Gate $G_I$ is unblocked during the 300-nanosecond period between any two consecutive sampling intervals, the capacitor $C_o$ being then aperiodically charged in a predominantly resistive, critically damped circuit including the amplifier $A_o$ and its associated impedances. Capacitor $C_o$ may discharge into the line condenser of any associated subscriber, such as condenser $C_i$, in the open state of a normally closed gate $G_{II}$ via a predominantly inductive circuit represented by a common inductance $X_o$ and individual inductances $X_l$, $X_i$, $X_n$ in the respective local lines. The reactances of these inductances and of the capacitors $C_o$, $C_l$, $C_i$, $C_n$ are so dimensioned as to allow for a resonant charge transfer from capacitor $C_o$ to the selected line condenser (e.g. $C_i$) during the sampling interval marked by the open state of the corresponding line gate ($G_i$), the unblocked condition of gate $G_{ll}$ coinciding with that of the line gate.

Figure 2:
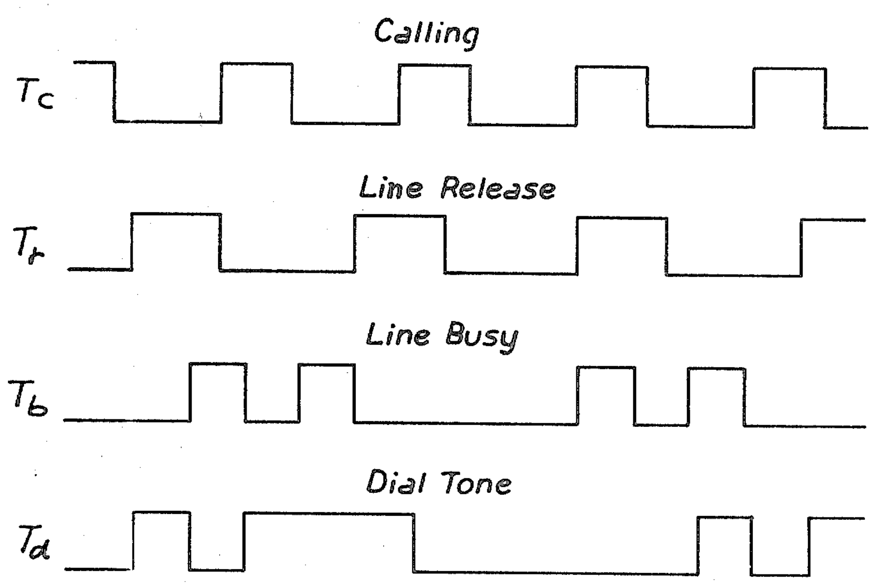
FIG. 2 is a set of graphs illustrating respective tone signals to be generated in the system of FIG. 1.

Gate $G_{ll}$ is controlled by an OR gate OG whose four inputs are tied to the outputs of responsive AND gates $AG_c$, $AG_r$, $AG_b$, $AG_d$; each of these AND gates has a first input connected to a corresponding wire $w_c$, $w_r$, $w_b$, $w_d$ and a second connected to a similarly designated lead $z_c$, $z_r$, $z_b$, $z_d$ (collectively labeled $g$) emanating from a set of pulse generators PG. These pulse generators operate continuously but are ineffectual as long as none of the associated AND gates is opened by an enabling signal from logic matrix LM. Their outputs have been illustrated in FIG. 2, by way of example, as respective modulating-pulse trains $T_c$, $T_r$, $T_b$ and $T_d$, it being understood that the length and spacing of these pulses are on the order of a second, as per conventional telephone practice, so that each pulse encompasses a large number of cycles of the output frequency of tone generator O.

The elements last described are also duplicated on the side of terminal E' where they have been designated by the same reference characters with the addition of prime marks.

Figure 3:
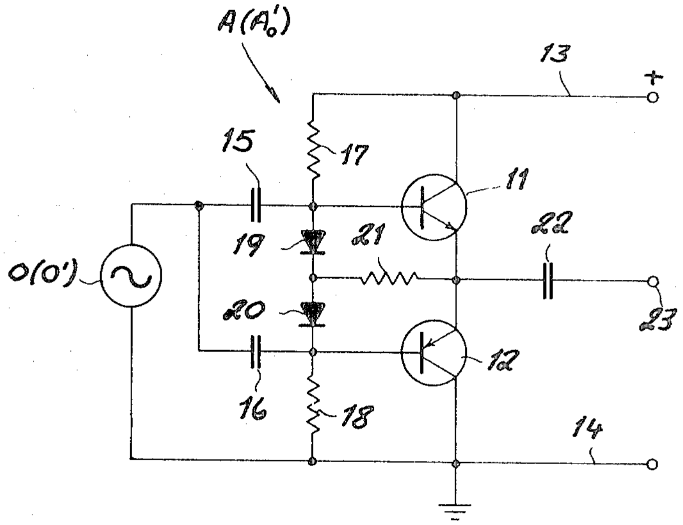
FIG. 3 shows a charging amplifier advantageously used in the system of FIG. 1.

The amplifier $A_o$ (or $A_o'$) may have the construction illustrated by way of example in FIG. 3. As shown there, this amplifier comprises two transistor stages 11 and 12, of opposite conductivity types, having their inputs connected in parallel across the output of oscillator O (or O'). The collector/emitter circuits of NPN transistor 11 and PNP transistor 12 are connected in series between a high-voltage bus bar 13 (here positive) and a grounded bus bar 14, the base of these transistors being tied to the ungrounded input terminal via respective coupling condensers 15 and 16. The input circuit of the amplifier further includes a pair of resistors 17 and 18 and a pair of diodes 19, 20 connected in series across the two bus bars, each transistor base being tied to the junction of one resistor and one diode. The common terminal of diodes 19 and 20 is returned to the two emitters through a further resistor 21, these emitters in turn being coupled through a condenser 22 to an output terminal 23.

The operation of the amplifier shown in FIG. 3 is as follows: During positive half-cycles of oscillator O, transistor 11 conducts and charges the condenser 22 positive; during negative half-cycles, transistor 12 conducts and reverses the polarity of the condenser charge. As long as terminal 23 remains insulated by the blocking of gate $G_l$ (or $G_l'$) connected thereto, the operation is virtually symmetrical so that the mean potential of condenser 22 is zero. Any unbalancing of the condenser potential by the opening of the gate during either positive or negative half-cycles is compensated by an increased conductivity of one or the other transistor.

Figure 4:
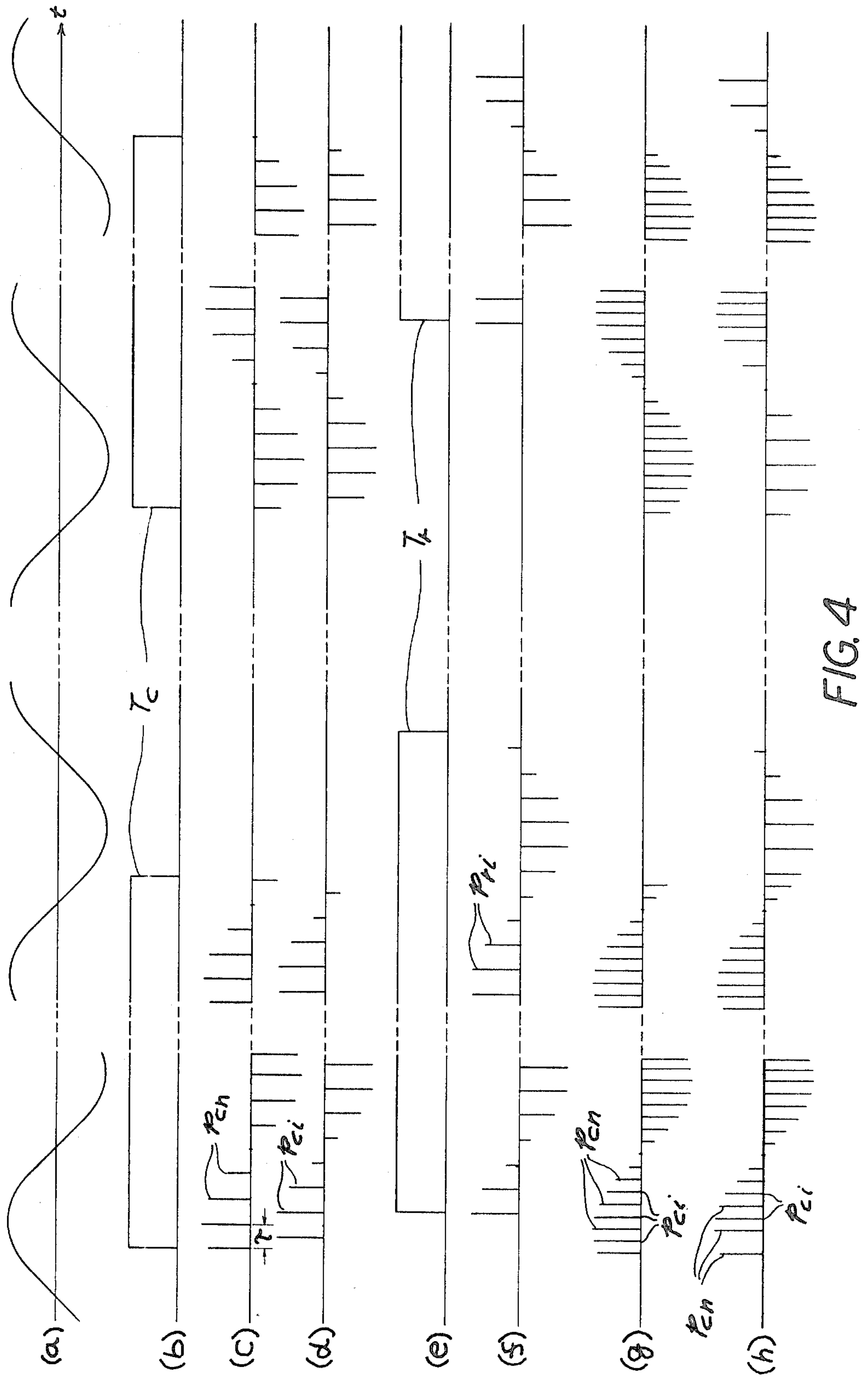
FIG. 4 is a set of graphs serving to explain the mode of operation of our improved system.

Reference will now be made to FIG. 4 for a description of certain typical situations that may arise during signaling. Graph (a) of FIG. 1 shows the output oscillation of tone generator O over a period of time $t$ extending over more than one cycle of modulating pulse $T_c$, graph (b). During this period, a local line (say, line $L_n$) is to receive a calling signal as determined by enabling pulses on lead $w_c$ which coincide with the pulses $P_n$ (FIG. 1). The coincidence of these enabling pulses with a modulating pulse $T_c$ charges the line condenser $c_n$ during short periods as indicated by pulses $p_{cn}$ in graph (c) of FIG. 4. These pulses, when integrated in filter $F_n$, reconstitute the original audio wave of graph (a) so as to give rise to a series of tone signals having the rhythm of modulating pulses $T_c$.

If the same calling signal is to be transmitted concurrently to, say, line $L_l$, the resulting charging pulses for condenser $C_l$ will be staggered with reference to pulses $P_{cn}$ as indicated at $P_{cl}$ in graph (d).

If, on the other hand, the second subscriber (line $L_l$) is to receive a different tone signal, e.g. a "line release" signal as represented by modulating pulses $T_r$ in graph (e), the resulting charging pulses $P_{rl}$ will occur in the same time slots as the pulses $P_{cl}$ in the previous instance but will be present during different periods of time as indicated in graph (f).

Graph (g) of FIG. 4 shows the simultaneous transmission of calling signals to lines $L_n$ and $L_l$, resulting in the interleaving of pulses $P_{cn}$ and $P_{cl}$; within any clock cycle of duration, under the conditions previously assumed, up to approximately 100 pulse trains may thus be concurrently transmitted.

Graph (h), similarly, shows the interleaving of pulses $P_{cn}$ and $P_{rl}$ from graphs (c) and (f) during transmission of two different tone signals $L_n$ and $L_l$. It will be apparent that, by the technique described above, such chopped tone signals may also be transmitted in interleaved relationship from terminal E to any called subscriber associated with that terminal or to any remote station associated with terminal E'.

We claim:

1. A telecommunication system comprising a terminal; a plurality of local lines ending at said terminal; first gate means individual to each of said lines; timer means for sequentially opening same during consecutive sampling intervals forming part of a clock cycle; individual condenser means for each of said lines connected to said first gate means thereof for receiving samples of messages, transmitted from said terminal to said lines, during the corresponding sampling intervals; filter means in series with said condenser means for integrating the message samples received during successive clock cycles; tone-generating means at said terminal connectable to any of said lines via said first gate means, said tone-generating means having an operating frequency of a period substantially greater than a clock cycle; second gate means common to all said lines interposed between said tone-generating means and said first gate means; a source of modulating pulses of a duration substantially exceeding said period; and actuating means for opening said second gate means during selected sampling intervals under the joint control of said timer means and said modulating pulses, thereby generating a series of characteristic tone signals in the output of said filter means.

2. A system as defined in claim 1 wherein said tone-generating means comprises a single generator of audiofrequency oscillation.

3. A system as defined in claim 1, further comprising capacitive means common to all said lines connected across said tone-generating means ahead of said first gate means, said second gate means including a charging gate between said tone-generating means and said capacitive means and a discharging gate between said capacitive means and said first gate means.

4. A system as defined in claim 3 wherein said charging gate is connected to said timer means for periodic opening thereby between consecutive sampling intervals, said actuating means comprising a source of enabling pulses timed to coincide with said selected sampling intervals and logical circuitry for simultaneously applying said enabling and modulating pulses to said discharging gate.

5. A system as defined in claim 4 wherein said source of modulating pulses comprises a plurality of pulse generators of different rhythm, said source of enabling pulses comprising a logic network with several output leads, said logical circuitry including a like plurality of AND gates each having inputs connected to a respective one of said leads and to the output of a respective one of said pulse generators.

6. A system as defined in claim 5 wherein said logical circuitry further includes an OR gate with a plurality of inputs respectively connected to the outputs of said AND gates and with an output controlling said discharge gate.

7. A system as defined in claim 4, further comprising predominantly resistive impedance means in series with said charging gate and predominantly inductive impedance means in series with said discharging gate for enabling an aperiodic charging and a resonant discharging of said capacitive means.

8. A system as defined in claim 7 wherein said predominantly resistive impedance means includes an amplifier with two transistor stages of opposite conductivity types connected in parallel across said tone-generating means.